United States Patent [19]

Unger et al.

[11] 4,017,528

[45] Apr. 12, 1977

[54] PREPARATION OF ORGANICALLY MODIFIED SILICON DIOXIDES

[75] Inventors: Klaus Unger, Darmstadt; Jürgen Schick-Kalb, Eichenzell near Fulda, both of Germany

[73] Assignee: Merck Patent Gesellschaft mit beschrankter Haftung, Darmstadt, Germany

[22] Filed: Nov. 11, 1974

[21] Appl. No.: 522,982

[30] Foreign Application Priority Data

Nov. 16, 1973 Germany ............................ 2357184

[52] U.S. Cl. .................... 260/448.8 R; 252/426; 252/428; 252/430
[51] Int. Cl.$^2$ .......................................... C07F 7/04
[58] Field of Search ................ 252/426, 428, 430; 260/448.8 R

[56] References Cited

UNITED STATES PATENTS

| 3,686,357 | 8/1972 | Cheeseman | 260/448.8 R |
|---|---|---|---|
| 3,846,358 | 11/1974 | Roedel | 260/448.8 R |
| 3,853,933 | 12/1974 | Siciliano | 260/448.8 R |
| 3,853,934 | 12/1974 | Siciliano et al. | 260/448.8 R |
| 3,892,678 | 7/1975 | Halasz et al. | 252/428 |

FOREIGN PATENTS OR APPLICATIONS 603,076  6/1948  United Kingdom

*Primary Examiner*—Patrick P. Garvin
*Assistant Examiner*—John P. Sheehan
*Attorney, Agent, or Firm*—Millen & White

[57] ABSTRACT

Process for the preparation of modified, porous silicon dioxides by the hydrolytic polycondensation of tetraalkoxysilanes or polyalkoxysiloxanes in the heterogenous phase in the presence of an organoalkoxysilane.

10 Claims, 2 Drawing Figures

FIG. 1

FIG. 2

PREPARATION OF ORGANICALLY MODIFIED SILICON DIOXIDES

BACKGROUND OF THE INVENTION

The surface of porous silicon dioxide can be chemically modified in accordance with various known methods in a manner which affects the adsorption properties thereof. For this purpose, mono- and/or polymolecular layers of certain groups which for the most part are functional are bound to the siloxane skeleton of the silicon dioxide by an Si—O—C—, Si—C—, or Si—N— bond. Thus, in correspondence with the chemical structure of the groups, modified silicon dioxides are obtained having specific adsorption properties. In this connection, basically the following methods are known:

1. Reaction of silicon dioxide with monomeric organosilicon compounds, thus introducing corresponding organosilyl groups which cover the surface of the $SiO_2$ in a monomolecular layer (c.f., e.g., K. Unger, Angewandte Chemie, Volume 84 (1972), page 331).

2. Substitution and/or polymerisation reactions involving the groups introduced according to (1) to produce polymolecular layers (c.f., e.g., O.E. Brust et al., Journal of Chromatography, Volume 83 (1973), page 15, and German Unexamined Laid-Open Application No. 2,309,129).

3. Reaction of silicon dioxide with oligomeric or polymeric organosiloxane compounds, which are chemically bound to the siloxane structure to produce layers with thicknesses of 30–2,000 A (c.f., e.g., German Unexamined Laid-Open Application No. 2,125,428).

All of these processes have a number of disadvantages which manifest themselves, in particular, when using the products thereof as carrier materials in chromatography or as catalysts.

In the reaction of silicon dioxide with organosilicon compounds, unreacted hydroxyl groups remain or new ones are simultaneously produced. Due the presence of such polar adsorption centers, the adsorption characteristic of the modified products is adversely affected. Furthermore, the silicon dioxide products modified by surface reactions often additionally contain physically adsorbed proportions of reaction products which, in part, desorb during subsequent use of the modified materials. In the case of polymeric layers on silicon dioxide, the adhesive strength of these layers, which is greatly dependent on the reaction conditions employed, is frequently impaired. Moreover, the porous layers are capable of swelling and are sensitive to changes in the pH of solutions with which they are in equilibrium.

It is an object of this invention to provide a process for producing, in a very simple manner, organically modified silicon dioxides which avoids the aforedescribed disadvantages.

SUMMARY OF THE INVENTION

In a process aspect, this invention relates to a process for the production of modified, porous silicon dioxides by the hydrolytic polycondensation of tetraalkoxysilanes or polyalkoxysiloxanes in the heterogeneous phase wherein the hydrolytic polycondensation is conducted in the presence of an organoalkoxysilane, preferably an organotriethoxysilane.

This invention also relates to the thus-modified, novel porous silicon dioxides thus produced and to chromatographic methods employing them as adsorbents.

DETAILED DISCUSSION

In the process of this invention, the agent yielding the modifying groups is present during the production of the porous silicon dioxide to be modified, so that the modifying groups are immediately incorporated into the skeleton structure. This is accomplished by the simultaneous hydrolytic polycondensation of a tetraalkoxysilane or polyalkoxysiloxane and a monomeric organosilicon compound. The organo-component as the modifying agent is, therefore, part of the skeleton structure and thus also part of the surface of the porous solid body. The desired Si—C— bonds in the final product are thus obtained, essentially from the Si—O—Si— bonds formed during the polymerization. The adsorption properties of the final product can be affected and controlled by the type of monomeric organosilicon compound employed, as well as by the quanitity thereof, based on the tetraalkoxysilane or polyalkoxysiloxane. By the type of hydrolysis and condensation conditions, as well as the manner in which the reaction is controlled, the parameters or the pore structure of the final products (specific surface area, specific pore volume, pore size distribution) can additionally be influenced and/or controlled. It is particularly advantageous that, according to this process, stable, highly porous organosilicon dioxides are produced.

The novel products can be produced in two ways, viz., a poly(organoalkoxysiloxane), is produced by the partial hydrolytic polycondensation of a solution of an organoalkoxysilane in a tetraalkoxysilane, is subjected to complete hydrolytic polycondensation (Method 1) or a polyalkoxysiloxane, produced by hydrolytic polycondensation of a tetraalkoxysilane with a restricted amount of water and in the presence of a solvent and an acidic catalyst, is subjected to a base catalyzed hydrolytic polycondensation in the presence of an organoalkoxysilane (Method 1).

METHOD 1

In the partial hydrolytic polycondensation step, the organoalkoxysilane content can be varied from about 0.1–3.0 moles, preferably 0.3 to 0.7 mole, per mole of tetraalkoxysilane. The hydrolysis takes place conventionally in the presence of an alcohol, preferably a lower alkanol, more preferably ethanol, employing less water than necessary for complete hydrolysis, viz., about 1.1–1.6 moles of water per mole of tetraalkoxy- and organoalkoxysilane, and an acidic catalyst. This partial hydrolysis is described in greater detail, for example, in German Unexamined Laid-Open Application DOS 2,155,281, whose disclosure is incorporated by reference. According to this method, the tetraalkoxysilane and organoalkoxysilane are dissolved in a solvent, suitably one, miscible with water. e.g., ethanol, and mixed with a limited amount of water, e.g., under agitation at room temperature, to effect partial hydrolysis. During this reaction a substance is added which yields hydrogen ions. This hydrolysis can be conducted most conveniently with aqueous hydrochloric acid.

The thus-obtained, usually homogeneous solution is stirred while introducing dry nitrogen, until no further temperature elevation can be detected, indicating the termination of the hydrolytic polycondensation. The main quantity of the solvent is distilled off from the reaction mixture. The thus-obtained residue, containing primarily the desired poly(organoalkoxysiloxane), is advantageously heat-treated at an elevated temperature, preferably in a temperature range of about 120°–140° C, for at least 24 hours. Thereafter, the reaction product is treated likewise at an elevated temperature, e.g., 150°–170° C, under reduced pressure, e.g., $10^{-1}$ to $10^{-3}$ torr, in order to remove any remaining solvent, water, and unreacted substances. All of these steps are conducted under an inert, e.g., nitrogen, atmosphere. By the number of moles of water added, it is possible to vary, in a controlled manner, the viscosity and the molecular weight of the thus-obtained poly(organoalkoxysiloxanes) in wide ranges. The average molecular weight of the thus-produced poly(organoalkoxysiloxanes) is preferably between about 300 and 5,000.

The preferred poly(organoalkoxysiloxanes) are those of the formula wherein Z is R or $OR_1$, R and $R_1$ have the values given hereinafter and $x$ is an integer, preferably one which provides a molecular weight of about 300 to 5,000, e.g., an integer from 3–40.

Thereafter, the poly(organoalkoxysiloxane) is subjected, in a likewise conventional manner, e.g., as described in DOS 2,155,281, to a complete hydrolytic polycondensation. Thereby, porous modified silicon dioxides can be produced in a reproducible process and with a cavity structure which is staggered in a controlled manner. The hydrolysis is achieved employing an excess of water, to which are added certain quantities of additives yielding hydroxyl ions. By varying the amount of hydroxyl ions in the hydrolytic polycondensation, the parameters of the cavity structure of the porous silicon dioxide preparations can be varied within wide ranges. With an increasing hydroxyl ion concentration, the average pore diameter as well as the specific pore volume are increased, and simulataneously the specific surface is reduced. In order to obtain the desired silicon dioxide preparations with average pore diameters of 30–800 A, hydroxyl ion concentrations are utilized of $1 \cdot 10^{-3}$ to 1.5 moles per mole of $SiO_2$ in the utilized poly(organoalkoxysiloxane).

Of the substances capable of yielding hydroxyl ions, alkali hydroxides are preferred. Due to their easy technical availability, ammonium hydroxide and sodium hydroxide are preferred. However, other compounds yielding hydroxyl ions can also be used, for example, alkali salts of weak acids, e.g., sodium acetate, and basic organic compounds, e.g., urotropine (hexamethylenetetramine), and amines, e.g., mono-, di-, and trimethylamine and/or mono-, di-, and triethylamine.

Ammonium hydroxide is preferably used in a concentration range of 0.013–1.33 moles per mole of $SiO_2$ in the poly(organoalkoxysiloxane). At these concentrations, the porosity of the thus-obtained silicon dioxide preparations is especially advantageous. It is possible to attain, without difficulties, porosity values of between 60 and 70%. The porosity value as used above is a measure which is independent of the nature of the porous substrate. It is defined by the following equation:

$$\text{porosity} = \frac{\text{specific pore volume [ml/g]} \times 100}{\text{specific pore volume + specific volume of the skeleton substance [ml/g]}}$$

In the present case, the value of the specific volume of the skeleton substance is practically identical with that of $SiO_2$, i.e. 0.45 ml/g. The preferred concentration ranges when using sodium hydroxide are from $1 \cdot 10^{-3}$ to 0.1 mole of NaOH per mole of $SiO_2$ in the poly(organoalkoxysiloxane). It is advantageous to adapt the catalyst concentrations to the product to be hydrolyzed, since with increasing organo group content, the hydrolysis velocity generally decreases.

The complete hydrolysis is suitably conducted by first introducing the usually hydrophobic poly(organoalkoxysiloxane) into a mixture of water and a water-miscible solvent, e.g., methanol, ethanol or dioxane. The mixture preferably consists of about 1.5–3 parts by volume of water per part by volume of solvent and is used so that about 16–18 moles of water are employed per mole of $SiO_2$ in the poly(organoalkoxysiloxane). The resulting heterogeneous mixture is then dispersed by agitation or shaking and then combined with the catalyst yielding hydroxyl ions, e.g., ammonium hydroxide. The reaction temperature can be varied in this reaction and is suitably in the range of about 20°–70° C. When increasing the reaction temperature under otherwise identical conditions, an increase in the average pore diameter attained. During agitation droplets of poly(organoalkoxysiloxanes) are produced which solidify into hard particles of modified, water-containing polysilicic acid gels. The thus-produced products are washed free of electrolyte, they are dried, e.g., at about 120° C, for about 24 hours or at lower temperatures under reduced pressure.

In a modification of this process, it is also possible first to apply the poly(organoalkoxysiloxane) obtained as the intermediate product to shaped articles of a nonporous material, for example glass, in a thin layer and then completely hydrolyze the thus-obtained coating as described above. In this way, porous layers of organosilicon dioxides on nonporous carrier materials can be produced in layer thicknesses of, for example, 0.1–1 $\mu$. For unmodified silicon dioxides, this process has been disclosed in German Published Applications DAS 2,225,973, whose disclosure of the process steps as described in that publication is incorporated by reference. See U.S. Pat. No. 3,922,392. In many cases, it is desirable to utilize silanized shaped bodies, e.g., silanized glass beads, since the poly(organoalkoxysiloxane) layer adheres better to such substrates. In this way, more uniform coatings are produced, whereas otherwise uniform wetting can not be ensured due to the fact that the hydrophobia increases with an increasing content of organo groups and as a result the shaped bodies may tend to cake together.

Surprisingly, the organo-component is almost quantitatively incorporated into the shaped bodies in accordance with this method, so that an accurate determination of the final product can readily be effected.

METHOD 2

By the hydrolytic polycondensation of a tetraalkoxysilane with a restricted amount of water, i.e. less than nessesary for obtaining complete hydrolysis, in the presence of a solvent and an acidic catalyst, as disclosed in DOS 2,155,281, polyalkoxysiloxanes are produced having molecular weights of about 1,000–3,000, which products are then isolated.

Examples of suitable polyalkoxysiloxanes thus produced are polyethoxysiloxanes having the following properties:

| Product | Kinematic Viscosity cSt | Average Molecular Weight | Content Si | (% by Weight) C | H |
|---|---|---|---|---|---|
| A | 8.8 | 750 | 23.8 | 36.2 | 7.8 |
| B | 10.3 | 800 | 24.2 | 32.2 | 7.6 |
| C | 157 | 1700 | 25.3 | 31.4 | 6.4 |
| D | 579 | 2000 | 26.1 | 30.7 | 6.3 |
| E | 16344 | 2800 | 27.2 | 29.5 | 6.2 |

Preferably, tetraethoxysilane is utilized as the starting material. However, it is also possible to use tetramethoxy-, tetrapropoxy-, and tetrabutoxysilane, and mixtures of these compounds.

The desired amount of an organoalkoxysilane is then dissolved in the polyalkoxysiloxane. The amount of organoalkoxysilane employed can vary from about 0.05 to 3.0, preferably 0.1 to 2.0 moles, per mole of $SiO_2$ in the polyalkoxysiloxane.

The resulting solution is conventionally dispersed, as in Method 1, in a mixture of water and a water-miscible organic solvent, preferably ethanol.

By the addition of a basic catalyst to the dispersion, preferably under agitation, the hydrolytic polycondensation occurs, producing spherical particles of organosilicon dioxide gel. Here, too, the reaction temperature can be varied in the range of about 20°–70° C. The particles are washed out and dried as described in Method 1.

A wide variety of compounds can be utilized as the monomeric organoalkoxysilane. The organo group, i.e., the group bonded to the silicon atom via a carbon-silicon bond, can be virtually any group. All that is required of it is a resistance to hydrolysis so that no undesired alteration of the organo group occurs during the production of the modified silicon dioxides. However, since the hydrolysis conditions are very gentle, the selection of the organo group for modifying purposes is hardly limited thereby.

Preferred organoalkoxysilanes are those of the formula $$R_n - Si - (OR_1)_{4-n}$$

are used wherein R is an alkyl, aryl, or aralkyl group which is unsubstituted or optionally substituted; $R_1$ is alkyl of 1–4 carbon atoms; and $n$ is the integer 1, 2 or 3, preferably 1.

Especially preferred are organotriethoxysilanes ($R_1$ = ethyl), since in these compounds the possibility for three-dimensional cross-linking is especially high. When R is a voluminous organo group, $n$ preferably is 1.

R preferably contains no more than 20 carbon atoms. When R is alkyl, the group can be straight or branched chains but the former is preferred in view of the utilization of the final products. The alkyl group can be lower-alkyl, e.g., methyl, ethyl, isopropyl, n-butyl, or higher alkyl, e.g., pentyl, octyl, nonyl, octadecyl.

Preferred aryl groups are carbocyclic aryl of 6–10 carbon atoms, especially phenyl and naphthyl, primarily because the organoalkoxysilanes bearing those groups can be produced quite easily, as well as substituted phenyl and naphthyl groups, e.g., p-tolyl. Preferred aralkyl groups are those with a carbocyclic aryl portion containing 6–10 carbon atoms, advantageously benzyl and substituted benzyl, as well as the corresponding naphthylmethyl groups.

Depending on the desired end use, the R groups can in all cases be substituted in many ways, by one, two or more functional or inert groups. Since these substituents do not impair the process of this invention, there is no necessity for the length enumeration of such substituents, which are illustrated in the organoalkoxysilanes named below. The process of the present invention is universally applicable in this respect.

As illustrative examples, a number of organotrialkoxysiloxanes are listed below, which in part are commercially available or which can be manufactured according to standard methods (for example, according to "Chemistry of the Silicones" by R. G. Rochow, publishers John Wiley & Sons, New York, 2nd ed., 1951):

methyltriethoxysilane
phenyltriethoxysilane
ethyltriethoxysilane
vinyltriethoxysilane
amyltriethoxysilane
β-cyanoethyltriethoxysilane
γ-aminopropyltriethoxysilane
β-nitroethyltriethoxysilane
γ-(aminocarbonyl)-propyltriethoxysilane
methylsulfonylmethytriethoxysilane
methylsulfinylmethyltriethoxysilane
methyltrimethoxysilane
phenyltrimethoxysilane
3-chloropropyltrimethoxysilane
perfluoropropyltrimethoxysilane
p-(methoxycarbonyl)-phenyltrimethoxysilane
γ-glycidoxypropyltrimethoxysilane
γ-mercaptopropyltrimethoxysilane
β-(3,4-epoxycyclohexyl)-ethyltrimethoxysilane
N-β-aminoethyl-α-aminopropyltrimethoxysilane
γ-methacryloxypropyltrimethoxysilane
N-(N-methoxycarbonylmethyl-β-ethylamino)α-aminopropyltrimethoxysilane
diphenyldiethoxysilane
β-cyanoethylmethyldiethoxysilane
dimethyldiethoxysilane
[N-β-(aminoethyl)-γ-(2-methyl)-propyl]-methyldimethoxysilane
p-sulfamoylphenylmethyldimethoxysilane
(α,γ-dihydroxypropyl)-methyldimethoxysilane.

As will be apparent, the organo groups of the thus-obtained organosilicon dioxides can also be additionally modified thereafter, especially by the introduction of functional groups. In this respect, all customary substitution methods can be used, so that a maximum number of variations is possible with respect to the organo groups, in a maximally simple manner. An example is the introduction of ion exchanger group. By the sulfonation of the corresponding benzyl or phenyl organosilicon dioxides, cation exchangers are produced, for example, having a relatively high exchange capacity which, surprisingly, is for these inorganic exchangers of the same order of magnitude as that of conventional organic resin exchangers.

The sulfonation is conducted according to standard methods, for example by reaction with chlorosulfonic acid in suspension with an organic solvent, e.g., carbon tetrachloride or chloroform. The individual reaction conditions are sufficiently described in the literature. Suitably, a heating step follows, for example by refluxing the reaction mixture. The thus-obtained product is then treated with water, the cation exchanger is filtered off, washed free of sulfate with distilled water, and dried in the usual manner.

The introduction of groups suitable for anion exchangers is effected most advantageously by haloalkylation and subsequent amination of the products produced according to the method of this invention. Most customary is the introduction of the chloromethyl group by reaction with chloromethylmethyl ether in the presence of catalysts, e.g., tin (IV) chloride or zinc chloride. The halomethylated products are then conventionally reacted with amines to obtain the desired anion exchangers. Basically, any amine which can be reacted with a chloromethyl group, as well as ammonia, can be utilized. The amines can be primary, secondary, or tertiary. The tertiary amines are generally preferred, because they yield strongly basic anion exchangers with quaternary groups. ESpecially readily available amines for the introduction of the quaternary groups are, for example, alkyl, dialkyl- and trialkylamines of 1–4 carbon atoms, in each alkyl group, which can be alike or different, e.g., mono-, di-, and triethylamine, and the corresponding hydroxy-substituted amines, e.g., dimethylaminoethanol and diethylaminoethanol.

Another example of functional groups which can be introduced are hydroxyl groups. Thus, 1,2-diol groups can be introduced into vinyl derivatives by oxidation and subsequent hydrolysis.

Due to the fact that the organic group of the organoalkoxysilane are directly incorporated into the skeleton substance, an extraordinarily broad range of possibilities with respect to the organic, modifying groups is afforded by the present invention.

Depending on the type of the R group in the starting material, hydrophobic or hydrophilic organosilicon dioxides are obtained. With benzyl- or phenyltriethoxysilane, for example, a strong hydrophobic effect is achieved. A measure thereof are the water vapor isotherms of the products. With an increasing content of the organo-component, the water absorption decreases. As can be seen from the appended drawings, the reduction is especially drastic in the range of between 40 and 60 vol. % of the organo-component. The water vapor isotherm of these materials is markedly below that of porous silicon dioxide, which according to the heretofore conventional processes, was made hydrophobic by reaction with trimethylchlorosilane or dimethyldichlorosilane.

Hydrophilic organosilicon dioxides are obtained by the use of correspondingly substituted organotrialkoxysilanes or by substitution reactions on the thus-obtained organosilicon dioxides.

The specific pore volume of the thus-formed modified silicon dioxides can be affected and/or controlled by the amount of the modifying organo-component. With increasing organo content, the specific pore volume increases greatly. The relative increase in the specific pore volume is furthermore affected by the size of the group R of the organotrialkoxysilane, in that the specific pore volume increases with an increasing size of the R group. Preferred organosilicon dioxides are those wherein the molecular weight ratio of the organo moiety to the silicon dioxide is agout 0.02 to 1.0.

The specific pore volume can also be influenced by the average molecular weight and/or the viscosity of the polyalkoxysiloxane employed. Polyalkoxysiloxanes of low viscosity are cross-linked only to a minor degree as compared to those of high viscosity. Preferred are those having a kinematic viscosity of from about 10 to 20,000 cSt. With the same content of organo-component, the specific pore volumes of the organosilicon dioxides obtained with low-viscosity polyalkoxysiloxanes are higher than those of the products obtained with higher-viscosity polyalkoxysiloxanes.

The other desired parameters of the cavity structure can be adjusted by varying the hydrolysis conditions in the hydrolytic condensation according to the data in DOS 2,155,281.

The porous modified silicon dioxides obtained according to the process of this invention are adsorbents with a large surface area with a spherical and simultaneously porous grain, which find many uses of application. They are suitable for gas, liquid, and thin-layer chromatograph. They are of special significance, for example, as stationary phases for chromatographic separation and analytical methods. Due to the fact that in this case the stationary phase is incorporated into the skelton substance, the carrier material contains a large amount of stationary phase, which is accessible due to the simultaneously forming pore system and which cannot be washed out. Thus, a considerable advantage is obtained as compared to the columns having mechanically mounted, liquid stationary phases. Also their higher capacity as compared to the conventional surface-modified carriers is of importance. Futhermore, it is important that, during preparative work, the eluted substances can be worked up more readily since they are not contaminated by stationary phase. The novel silicon dioxides can also be bound to additional substrates, for example to the column wall when using a capillary.

The products of this invention can be utilized in the same manner as unmodified silica gels. Thus, they can also be utilized, for example, as the chromatographically active material applied to plates or foils in thin layer for thin layer chromatography. The are also well suitable for gradient elution and for liquid-chromatographical separations programmed with respect to flow and temperature. The polarity of the solvent can be varied as desired during the analysis, without fear that the stationary phase will be removed by dissolving.

It is thus possible to separate a sample with a very differing distribution behavior in a chromatographic process. The products of this invention can also be utilized similarly to surface active carbons for the solid-liquid extraction of nonpolar components from polar solvents, wherein the large specific pore volume (>1 ml./g.) is of advantage.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1 a. One mole of tetraethoxysilane is mixed respectively with 0.25 mole (or 0.50 mole) of the following organotriethoxysilanes:

methyltriethoxysilane
benzyltriethoxysilane
phenyltriethoxysilane
n-pentyltriethoxysilane
n-octadecyltriethoxysilane
vinyltriethoxysilane.

The mixture is combined with 110 ml. (or 140 ml.) of ethanol, as well as 20 ml. (or 30 ml.) of 0.01N hydrochloric acid. The solution is agitated at room temperature for about 30 minutes and heated to 120° C. While purging with dry nitrogen.

The alcohol is gradually distilled off at this temperature under agitation. Thereafter, the mixture is heated for several minutes to 140° C. under reduced pressure (about 0.1 torr [mm. Hg]) to remove further volatile components.

The poly(organoethoxysiloxanes) obtained in this way are viscous liquids having an average molecular weight of about 300 –1,400. The content of organic groups (organo-groups) is respectively 0.2 mole, according to nuclear resonance measurements.

b. An amount of each of such poly(organoethoxysiloxanes), corresponding to 1 mole of $SiO_2$, is respectively emulsified with 360 ml. of an ethanol/water mixture (volume ratio 1:3) and heated to about 70° C. Under rapid agitation, respectively 50 ml. of a concentrated ammonia solution is added thereto. After one hour, the mixture is decanted several times with softened water. The suspension is allowed to stand for 12 hours. Then, the organosilicon dioxide is separated, washed repeatedly with detailed water, and dried for 2 hours at 120° C.

The specific surfaces of the organosilicon dioxides are determined according to the BET standard method, while the specific pore volumes are found according to Mottlau by titration with ethanol.

The results are compiled in Table I.

TABLE I

| Product | Mole of Organotriethoxysilane per Mole of Tetraethoxysilane | R | Molecular Weight of the Poly(organoalkoxysiloxane) Intermediate of Example 1(a) | Organosilicon Dioxides Specific Surface $S_{BET}$ m²/g. | Specific Pore Volume $V_P$ ml./g. |
|---------|---|---|---|---|---|
| a | 0.50 | Methyl | 330 | 138 | 0.39 |
| b | 0.25 | Methyl | 310 | 5 | 0.37 |
| c | 0.50 | Benzyl | 825 | 526 | 1.74 |
| d | 0.25 | Benzyl | 810 | 464 | 0.47 |
| e | 0.50 | Phenyl | 1390 | 595 | 0.67 |
| f | 0.25 | Phenyl | 690 | 435 | 0.64 |
| g | 0.25 | n-Pentyl | 830 | 620 | 0.42 |
| h | 0.25 | n-Octadecyl | 860 | 2 | 0.57 |

EXAMPLE 2 a. Analogously to Example 1 (a), poly ( phenylethoxy-siloxanes) having a differing phenyl content, namely 0.1, 0.2, and 0.3 mole of phenyl per mole of $SiO_2$, are prepared. Average molecular weights: 420, 630, and 850, respectively.

b. In a round flask, 50 g. of silanized glass beads (particle diameter 30–40μm) is combined with respectively 4 g. of a poly (phenylethoxysiloxane) obtained according to Example 2(a), as well as with 20 ml. of diethyl ether, so that a uniformly flowing mixture is produced. The ether serves for improving the distribution of the poly(phenylethoxysiloxane) on the surface of the glass beads and is subsequently removed with the use of a rotary evaporator. 50 ml. of an ethanol/water mixture (volume ratio 1:2) is added to these glass beads coated with poly(phenylethoxysiloxane), and the mixture is thoroughly shaken for several minutes. Thereafter, 5 ml. of a concentrated ammonia solution (25% strength) is added to the suspension, and the thorough shaking is continued for another 5 minutes. The suspension is then allowed to stand for 1 hour with occasional shaking. The coated glass beads are then separated and slurried 2-3 times with the aforementioned ethanol/water mixture, and then decanted. The same procedure is repeated once more with ethanol and with ether. The products are then dried at 120° C.

The coated glass beads have the following specific surface areas and specific pore volumes, respectively:

TABLE II

| Organosilicon Dioxide | Specific Surface $S_{BET}$ m²/g. | Specific Pore Volume $V_P$ ml./g. |
|---|---|---|
| 0.1 mole phenyl | 23.8 | $2.0 \cdot 10^{-2}$ |
| 0.2 mole phenyl | 23.9 | $1.6 \cdot 10^{-2}$ |
| 0.3 mole phenyl | 18.3 | $1.5 \cdot 10^{-2}$ |

EXAMPLE 3

The following solutions are prepared from the products:

A: polyethoxysiloxane, average molecular weight 800, and
B: benzyltriethoxysilane.

| (a) | 80 ml. A  20 ml. B | (b) | 60 ml. A  40 ml. B |
| (c) | 40 ml. A  60 ml. B | (d) | 20 ml. A  80 ml. A |
| (e) | 100 ml. A | | |

These solutions are emulsified respectively with 360 ml. of an ethanol/water mixture (volume ratio 1:3) and then combined at 70° C. under agitation with 50 ml. of concentrated ammonia. After 1 hour of agitation, the organosilicon dioxide is washed out, allowed to stand for 12 hours with water, and worked up as described in Example 1.

Figure 1:
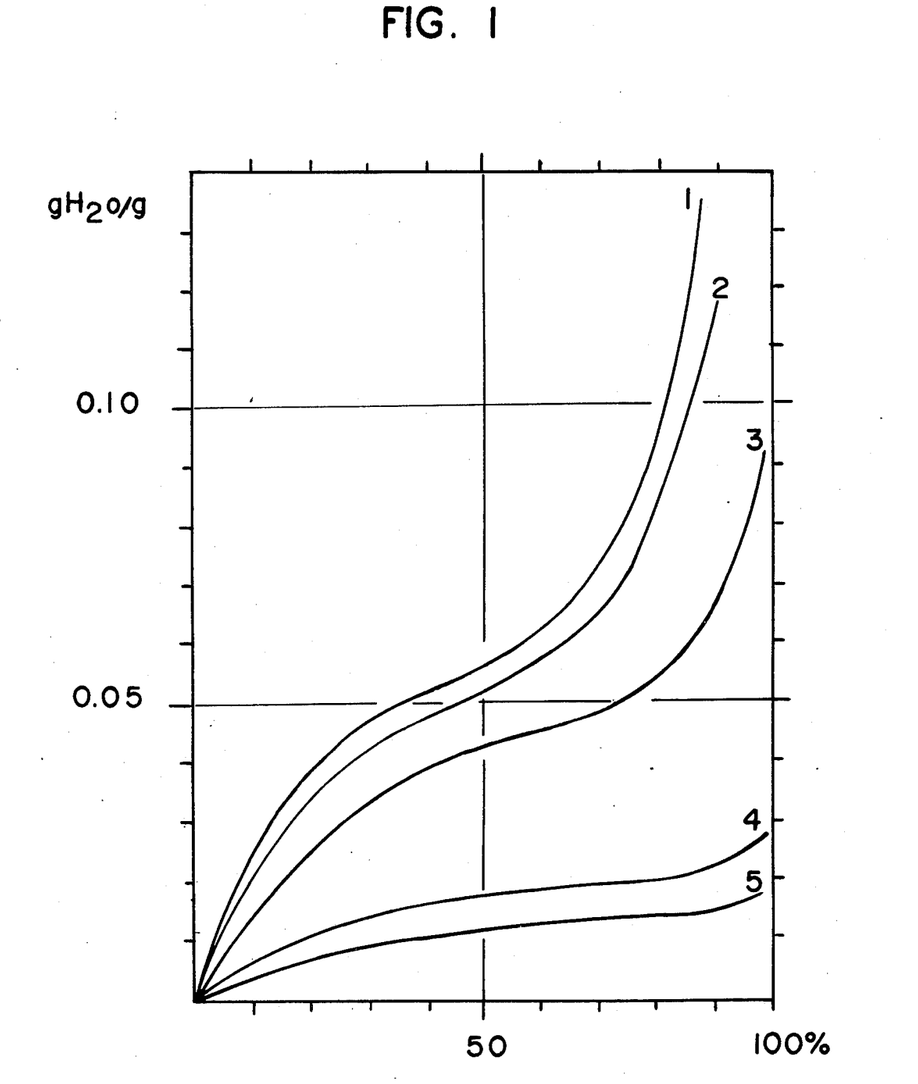

FIG. 1 shows the water vapor isotherms at 20.0° C. recorded with the products modified with benzyltriethoxysilane.

The curves clearly show the hydrophobic character of the organosilicon dioxides. The hydrophobia increases with an increasing benzyl group content.

| Product | Addition of Benzyltriethoxysilane per Mole of $SiO_2$ in the Polyethoxysiloxane |
|---|---|
| 1 | — |
| 2 | 0.1 mole |
| 3 | 0.3 mole |
| 4 | 0.7 mole |
| 5 | 1.9 mole |

EXAMPLE 4

Analogously to Exampe 3, organosilicon dioxides are produced, but in each case with the aid of phenyltriethoxysilane in place of benzyltriethoxysilane.

The water vapor isotherms recorded with these products at 20.0° C. show a curve analogous to that indicated in FIG. 1.

EXAMPLE 5

Analogously to Example 3, various organosilicon dioxides are produced, wherein as component B of the solutions respectively 40 ml. of the following products is utilized (corresponding to respectively 0.3 mole of organotriethoxysilane per mole of $SiO_2$ in the polyethoxysiloxane):
a. methyltriethoxysilane,
b. n-pentyltriethoxysilane,
c. vinyltriethoxysilane,
d. phenyltriethoxysilane,
e. benzyltriethoxysilane.

The thus-obtained organosilicon dioxides are worked up analogously to Example 3. The properties of these organosilicon dioxides can be seen from the following table:

TABLE III

| Product | Specific Surface $s_{BET}$ m$^2$/g. | Specific Pore Volume $v_P$ ml./g. |
|---|---|---|
| a | 590 | 1.40 |
| b | 480 | 2.98 |
| c | 435 | 1.67 |
| d | 320 | 1.74 |
| e | 283 | 2.19 |

Figure 2:
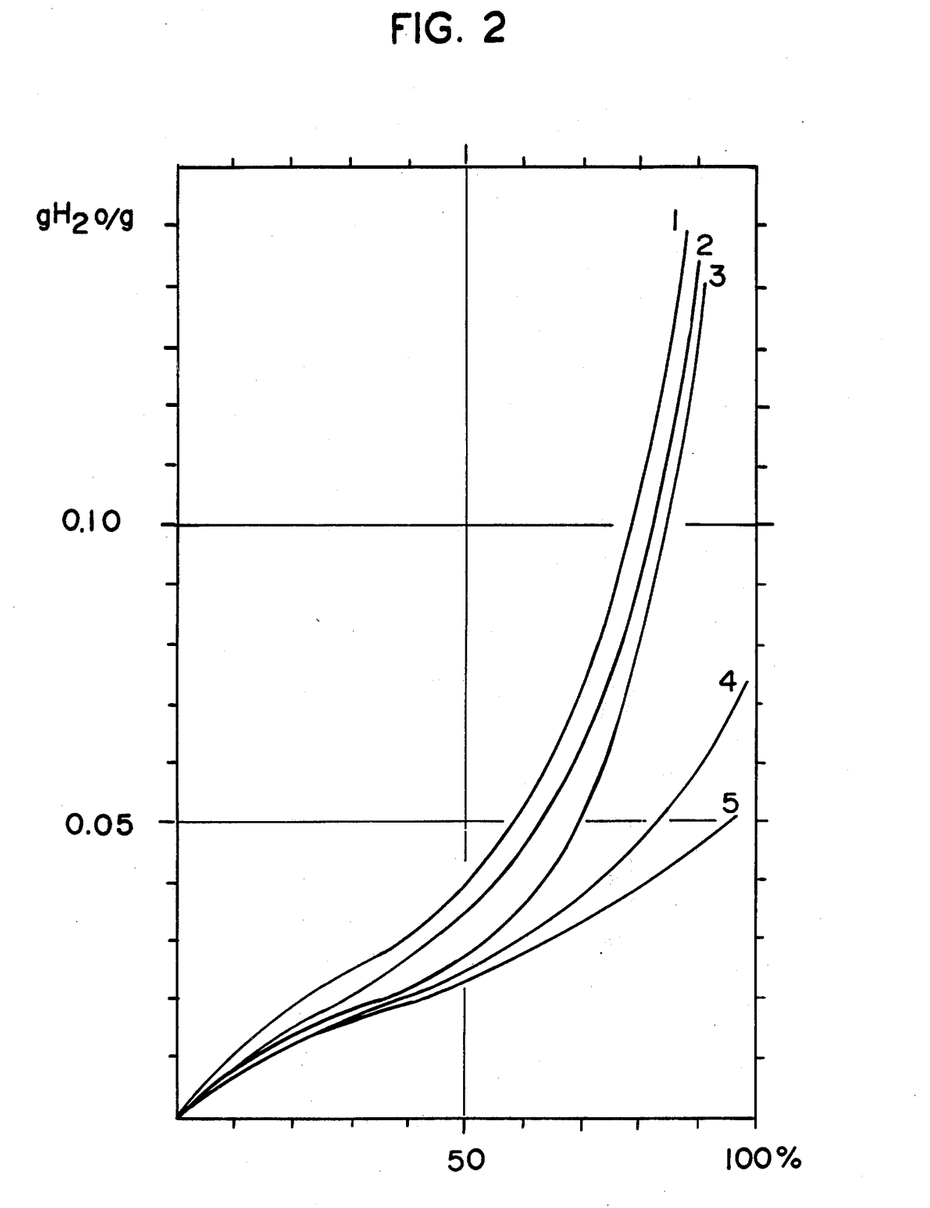

The water vapor isotherms recorded with these products at 20.0° C. are illustrated in FIG. 2. On the abscissa is plotted the ml. $H_2O$/g. and on the ordinate the relative humidity. The products (a) through (e) correspond to substances 1 through 5 indicated in FIG. 2.

The hydrophobic character of the novel products, which increases with a rising content of organo groups can clearly be seen therefrom.

EXAMPLE 6

40 ml. of γ-aminopropyltriethoxysilane is dissolved in 60 ml. of polyethoxysiloxane, average molecular weight 2,000, and the solution is emulsified in 400 ml. of an ethanol/water mixture (volume ratio 1:3). The emulsion is heated to 70° C. and mixed under rapid agitation with 10 ml. of a concentrated ammonia solution. After a reaction time of 30 minutes, the mixture is decanted repeatedly with desalted water. The suspension is allowed to stand for 12 hours. Then, the hydrophilic organosilicon dioxide is filtered, washed, and dried at 120° C.

The specific surface area is 450 m$^2$/g., the specific pore volume is 0.57 ml./g.

EXAMPLE 7

4.5 g. of an organosilicon dioxide with vinyl groups produced analogously to Example 1 (content 0.3 mole of vinyltriethoxysilane per mole of $SiO_2$ in the polyethoxysiloxane) is introduced into a mixture of 216 g. of 98% formic acid and 26.8 g. of 30% hydrogen peroxide. The suspension is shaken. The reaction mixture is then heated and maintained for 1 hour at 80°–π° C. The hydroxylated organosilicon dioxide (organo group $HO-CH_2-CH(OH)-$) is filtered, washed with alcohol, and dried in a drying chamber at 120° C.

The product has a specific surface of 490 m$^2$/g. and a specific pore volume of 1.49 ml./g.

EXAMPLE 8

The following solutions are produced:
a. 100 ml. of polyethoxysiloxane, average molecular weight 2,000,
b. 80 ml. of polyethoxysiloxane, average molecular weight 2,000
+ 20 ml. of benzyl- (phenyl-, vinyl-, n-pentyl-, methyl-) triethoxysilane,
c. 60 ml. of polyethoxysiloxane, average molecular weight 2,000
+ 40 ml. of benzyl- (phenyl-, vinyl-, n-pentyl-, methyl-) triethoxysilane.

Respectively 100 ml. of these solutions is emulsified respectively in 400 ml. of an ethanol/water mixture (volume ratio 1:3). After heating to 70° C., 10 ml. of a concentrated ammonia solution (25%) is added under agitation to each batch. After 1 hour of reaction, the products are decanted repeatedly with demineralized water and allowed to stand for 12 hours. Thereafter, the organosilicon dioxides are filtered, washed, and dried.

The specific pore volume is determined according to Mottlau by titration with ethanol, and the specific surface is determined according to the BET method. The results are compiled in Table IV.

TABLE IV

| Mole of Organotriethoxysilane per Mole of $SiO_2$ in the Polyethoxysiloxane | R | Specific Surface $s_{BET}$ m$^2$/g. | Specific Pore Volume $v_P$ ml./g. |
|---|---|---|---|
| 0 | — | 524 | 0.73 |
| 0.1 | vinyl | 557 | 0.70 |
| 0.3 | vinyl | 564 | 0.97 |
| 0.1 | benzyl | 518 | 1.03 |
| 0.3 | benzyl | 423 | 1.52 |
| 0.1 | phenyl | 543 | 0.98 |
| 0.3 | phenyl | 421 | 1.21 |
| 0.1 | n-pentyl | 450 | 1.12 |
| 0.3 | n-pentyl | 362 | 1.86 |

TABLE IV-continued

| Mole of Organo-triethoxysilane per Mole of SiO$_2$ in the Polyethoxysiloxane | R | Specific Surface s$_{BET}$ m$^2$/g. | Specific Pore Volume v$_P$ ml./g. |
|---|---|---|---|
| 0.7 | n-pentyl | 372 | 2.68 |
| 0.1 | methyl | 618 | 0.70 |
| 0.3 | methyl | 646 | 0.88 |
| 0.5 | methyl | 965 | 1.04 |
| 0.7 | methyl | 625 | 1.27 |

EXAMPLE 9

Production of Cation Exchangers

Respectively 10 g. of the following products:
I. : product c from Example 3
II. : product c from Table IV
III. : product c from Table I
is suspended in 60 ml. of carbon tetrachloride. After cooling to 0° C. and under agitation, 30 ml. of chlorosulfonic acid emulsified in 60 ml. of carbon tetrachloride is added dropwise there-to in incremental portions under the exclusion of moisture. The reaction mixture is gradually heated to the boiling point of carbon tetrachloride and refluxed for 20 hours, whereupon it is poured on ice. The thus-obtained cation exchanger is filtered and washed in succession with water, alcohol, and ether; then, the product is dried at 150° C.

The useful capacity of the sulfonated products is determined by titration with 0.1N sodium hydroxide solution.
Product I : 2.0 meq/g.
Product II : 1.9 meq/g.
Product III: 2.4 meq/g.

EXAMPLE 10 a. 30 g. of a benzylated silicon dioxide preparation produced according to Example 1 (product c from Table I) is suspended in 100 ml. of dichloromethane. Then, 12.3 g. of zinc chloride and 80 ml. of chloromethyl methyl ether are added thereto. The reaction mixture is refluxed under agitation for 24 hours (at approximately 50° C.). After cooling, 200 ml. of methanol is added thereto. The chloromethylated benzyl silicon dioxide is filtered, washed with methanol and dioxane, and dried at 100° C.

b. 2.5 g. of the chloromethylated benzyl silicon dioxide preparation produced according to Example 10(a) is combined with respectively 80 ml. of a 50% solution of one of the following amines in dioxane:
(α) trimethylamine,
(β) triethylamine,
(γ) dimethylaminoethanol.

The suspension is allowed to stand for several days at 0° C. with occasional shaking. The reaction mixture is then filtered, washed with dioxane, and dried at 100° C.

The properties of the thus-obtained products can be seen from Table V.

TABLE V

| Exchanging Group | Exchange Capacity meq/g. |
|---|---|
| $-CH_2-\langle\bigcirc\rangle-CH_2\overset{+}{N}-(CH_3)_3$ | 2.1 |
| $-CH_2-\langle\bigcirc\rangle-CH_2\overset{+}{N}-(C_2H_5)_3$ | 1.8 |
| $-CH_2-\langle\bigcirc\rangle-CH_2\overset{+}{N}\begin{smallmatrix}(CH_3)_2\\ \\CH_2CH_2OH\end{smallmatrix}$ | 2.1 |

PRACTICAL EXAMPLES

A: Separation of Amino Acids

The product III obtained according to Example 9 is utilized for the separation of amino acids in a liquid chromatograph.

Sharp peaks (detector: UV photometer 570 nm.) were obtained for the amino acids listed in Table VI.
a. acid and neutral amino acids,
b. basic amino acids.

| | a | b |
|---|---|---|
| Length of column | 55 cm. | 27 cm. |
| Internal diameter | 0.9 cm | 0.6 cm. |
| Column temperature | 30.0° C. | 50.0° C. |
| Eluent – sodium citrate solution concentration | 0.1 N | 0.35 N |
| pH | 2.70 and 4.25 | 5.0 |
| throughflow speed | 36 ml./h. | 36 ml./h. |
| ninhydrin reagent | 18 ml./h. | 18 ml./h. |

The results of the evaluation are set forth in Table VI below.

TABLE VI

| Amino Acid | pH | Retention Time Minutes |
|---|---|---|
| Cysteine | 2.70 | 50 |
| Aspartic acid | | 91 |
| Serine | | 98 |
| Asparagine | | 106 |
| Glycine | | 118 |
| Tyrosine | | 125 |
| Methionine | | 130 |
| Isoleucine | 4.25 | 137 |
| Phenylalanine | | 143 |
| Tryptophan | | 18 |
| Lysine | 5.0 | 27 |
| Histidine | | 31 |
| Arginine | | 41 |

B: Testing as Stationary Phase

The organosilicon dioxides obtained according to Example 2 were utilized as stationary phases in chromatographic investigations. From the reduction in the relative retention times of the substances of a test mixture, the decrease in the hydroxyl groups of the $SiO_2$ skeleton can clearly be seen.

a. Separation of benzene (B), m-terphenyl (T), and m-quinquephenyl (Q) with absolute n-heptane as the mobile phase.

| Stationary Phase | $r_B$ | $r_T$ | $r_Q$ |
|---|---|---|---|
| 0.1 mole phenyl | 0.33 | 1.9 | 11.5 |
| 0.2 mole phenyl | 0.25 | 1.25 | 6.2 |
| 0.3 mole phenyl | 0.2 | 0.62 | 1.3 | b. Separation of ethanol (A), n-butanol (B), and methyl isopropyl ketone (K) with water/methanol (20 vol.-%) as the mobile phase.

The increase in the relative retention times $r$ corresponds to the increase in phenyl groups.

| Stationary Phase | $r_A$ | $r_B$ | $r_K$ |
|---|---|---|---|
| 0.1 mole phenyl | 0.03 | 0.19 | 0.42 |
| 0.2 mole phenyl | 0.07 | 0.32 | 1.03 |
| 0.3 mole phenyl | 0.07 (0.09) | 0.32 (0.41) | 0.98 (1.28) |

In the parenthetical data, the differences in specific surface have been corrected.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of a porous silicon dioxide bearing organosilyl groups on the surface thereof by the hydrolytic polycondensation of a tetraalkoxysilane or a polyalkoxysiloxane in the heterogeneous phase, the improvement which comprises conducting the hydrolytic polycondensation in the presence of a monomeric organoalkoxysilane, the organo-group of which is not hydrolyzable under conditions of said hydrolytic polycondensation, thereby producing a porous silicon dioxide bearing organic groups which are part both of the skeleton structure and the surface of the porous silicon dioxide.

2. A process according to claim 1, wherein the monomeric organoalkoxysilane is of the formula $$R_n- -Si 13 (OR_1)_{4-n}$$

wherein R is an alkyl, aryl, or aralkyl group; $R_1$ is alkyl of 1–4 carbon atoms; and $n$ is the integer 1, 2 or 3.

3. A process according to claim 2 wherein $n$ is 1.

4. A process according to claim 3 wherein $R_1$ is ethyl.

5. A process according to Claim 3 wherein R is alkyl of 1–4 carbon atoms, carbocyclic aryl of 6–10 carbon atoms or aralkyl with a carbocyclic aryl portion containing 6–10 carbon atoms.

6. A process according to claim 5 wherein $R_1$ is ethyl.

7. A process according to claim 6, wherein R is methyl, vinyl, n-pentyl, n-octadecyl, benzyl or phenyl.

8. A process according to claim 1 wherein 0.1–3.0 moles of organoalkoxysilane is employed per mole of $SiO_2$ in the tetraalkoxysilane or in the polyalkoxysiloxane.

9. A porous silicon dioxide bearing organosilyl groups on the surface thereof, produced according to the process of claim 1, thereby producing a porous silicon dioxide bearing organic groups which are part both of the skeleton structure and the surface of the porous silicon dioxide.

10. A process according to claim 1 wherein alkoxy in the tetraalkoxysilane or polyalkoxysiloxane is of 1–4 carbon atoms.

* * * * *

UNITED STATES PATENT AND TRADEMARK OFFICE
CERTIFICATE OF CORRECTION

PATENT NO. : 4,017,528
DATED : April 12, 1977
INVENTOR(S) : KLAUS UNGER ET AL.

It is certified that error appears in the above–identified patent and that said Letters Patent are hereby corrected as shown below:

Column 16, line 15: the formula should read:

$$--- R_n - Si - (OR_1)_{4-n} ---.$$

Signed and Sealed this

Fourteenth Day of June 1977

[SEAL]

Attest:

RUTH C. MASON
*Attesting Officer*

C. MARSHALL DANN
*Commissioner of Patents and Trademarks*